United States Patent
Matsushima et al.

[19]

[11] Patent Number: 5,875,120
[45] Date of Patent: *Feb. 23, 1999

[54] INFORMATION PROCESSING SYSTEM

[75] Inventors: Shinji Matsushima, Yokohama; Seiichi Kawano, Sagamihara; Masayoshi Nakano; Takashi Inui, both of Yokohama, all of Japan

[73] Assignee: International Business Machines Corporation, Armonk, N.Y.

[ * ] Notice: This patent issued on a continued prosecution application filed under 37 CFR 1.53(d), and is subject to the twenty year patent term provisions of 35 U.S.C. 154(a)(2).

[21] Appl. No.: 676,580

[22] Filed: Jul. 1, 1996

[30] Foreign Application Priority Data

Oct. 26, 1995 [JP] Japan .................................. 7-278961

[51] Int. Cl.$^6$ ........................................................ G06F 1/00
[52] U.S. Cl. ........................................ 364/707; 395/750.03
[58] Field of Search .............................. 364/707, 934.51; 395/560, 185.04, 183.06, 750.03, 750.04, 750.05, 750.06

[56] References Cited

U.S. PATENT DOCUMENTS

| | | | |
|---|---|---|---|
| 4,819,164 | 4/1989 | Branson | 395/556 |
| 5,083,266 | 1/1992 | Watanabe | 395/560 |
| 5,125,088 | 6/1992 | Culley | 395/500 |
| 5,167,024 | 11/1992 | Smith et al. | 395/750.04 |
| 5,239,652 | 8/1993 | Seibert et al. | 395/750 |
| 5,546,568 | 8/1996 | Bland et al. | 395/556 |
| 5,546,591 | 8/1996 | Wurzburg et al. | 395/750.04 |
| 5,590,341 | 12/1996 | Matter | 395/750.03 |
| 5,713,028 | 1/1998 | Takahashi et al. | 395/750.04 |
| 5,740,454 | 4/1998 | Kelly et al. | 395/750.03 |

FOREIGN PATENT DOCUMENTS 0529269  11/1992  European Pat. Off. .
0579369   3/1993  European Pat. Off. .

*Primary Examiner*—Emmanuel L. Moise
*Attorney, Agent, or Firm*—Anthony N. Magistrale; Daniel E. McConnell

[57] ABSTRACT

An information processing system which has (a) a CPU that is operated in a normal mode during which the CPU is driven at a relatively fast operating clock rate, and a power saving mode during which the operating clock has a lower rate or is halted; (b) at least one peripheral device; (c) a bus for performing communication between the CPU and the peripheral device; (d) a termination detector detecting a completion of a predetermined transaction between the CPU and the peripheral device; (e) a time counter measuring a predetermined period of time after the completion of the predetermined transaction; and (f) a power saving control causing the CPU enter the power saving mode until the time counted by the time counting means reaches the predetermined period of time.

4 Claims, 5 Drawing Sheets

TR1: 256 ONE WORD TRANSFERS COMPLETED
TR2: TIME OUT

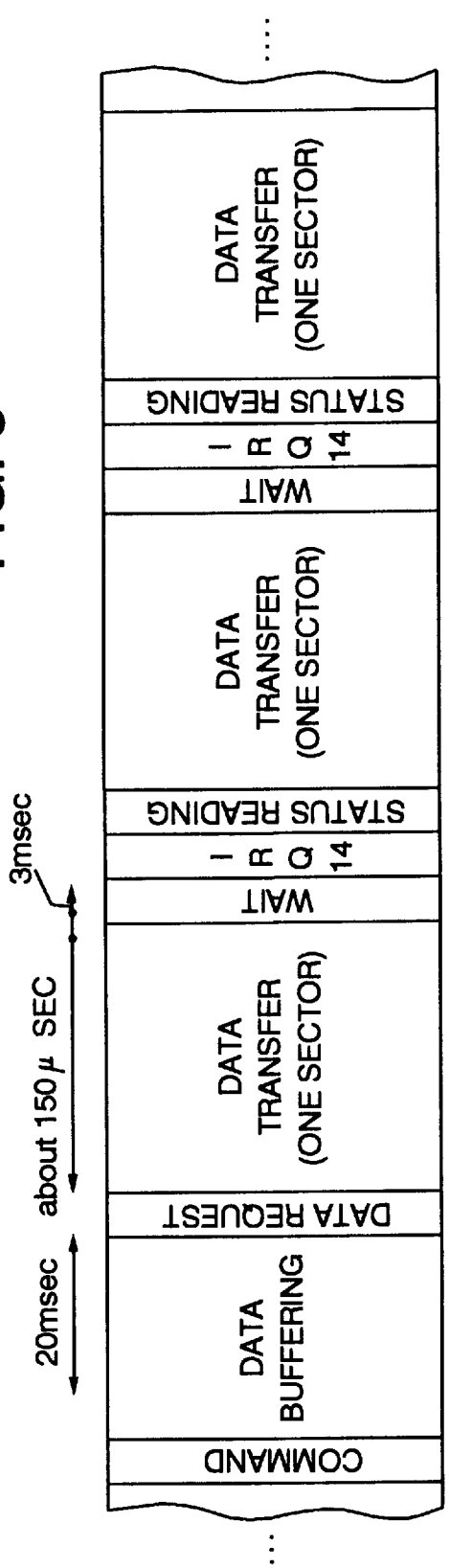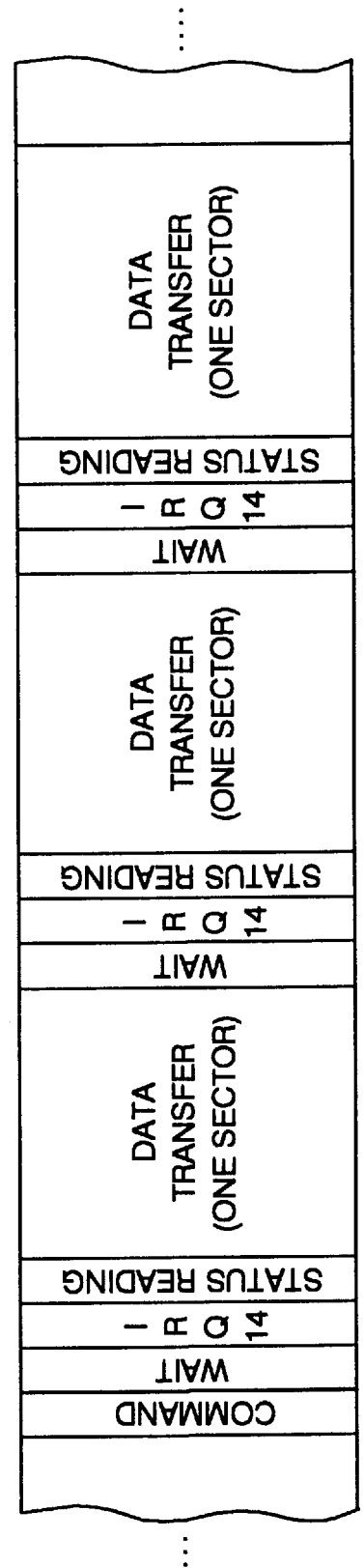

INFORMATION PROCESSING SYSTEM

BACKGROUND OF THE INVENTION

The present invention relates to an information processing system, such as a personal computer (PC), and in particular to an information processing system with a power saving function that, as needed, reduces the operating frequency of a processor (a so-called CPU or Central Processing Unit), or entirely halts the operation of the processor in order to reduce the power consumption. More specifically, the present invention pertains to an information processing system that satisfies both requests for power saving and for security of a system, and that can reduce the operating frequency of the CPU or can entirely halt the operation of the CPU even during a period in which asynchronous communication with a peripheral device is executed.

As progress in the current technique continues, various types of personal computers (hereafter referred to as "PCs" or "systems"), such as desktop and notebook computers, are being manufactured and widely sold. The notebook PCs that are compact and light, since for their design, portability and outdoor use are taken into consideration.

One of the features of notebook PCs is that they are "battery operable" and can be driven by an incorporated battery. Such a system can be used at sites where there are no commercially available power sources. A battery that is incorporated in a notebook PC is commonly formed as a "battery pack", which is a package that comprises a plurality of rechargeable battery cells (also called a "secondary cell"), such as Ni-Cd, NiMH, or Li-Ion. Although such a battery pack is reusable by being recharged, the battery duration is sufficient to supply power for only two to three hours of system operation time. Therefore, various ideas for power saving have been implemented to extend the time between charge periods for a battery. The introduction of the power saving function can constitute another feature for the notebook PCs.

At present, from an ecological point of view, the demand for power saving has increased even for desktop PCs that can be powered almost endlessly by commercially available power sources. And in June 1993, the U.S. Environmental Protection Agency (EPA) advocated the self-imposed regulations called the "Energy Star Computer program", and required that power consumed in the standby state be lower than a predetermined value (driving power is to be 30 W or less, or 30% or less than it is when the CPU is active). Computer makers have developed and manufactured products that conform to the suggested regulation. For example, desktop PCs that have a power saving function are already sold by IBM Japan, Ltd. (e.g., the PS/55E (for which "Green PC" is a common name), PC 750, and the Aptiva series ("Aptiva" is a trademark of IBM Corp.)).

Power saving with a PC can be accomplished by, for example, reducing operational power consumption by the individual electric circuits in a system. Power savings can also be provided by reducing or halting, as needed, the power supply to the individual electric circuits (or peripheral devices) in the system in accordance with the reduction of their operational state (activity). The latter power saving function may especially be called a "power management" function.

The power management modes of a PC are an "LCD backlight-OFF" mode and an "HDD-OFF" mode, which halts the power supply to devices, such as an LCD (Liquid Crystal Display) and its backlight, or a rotary motor of an HDD (hard disk drive), that account for the greatest share of the total power consumption by a full system. The other example power management modes are a "CPU slow clock/stop clock" mode, in which the operating frequency of a CPU (Central Processing Unit) is reduced or the operation of the CPU is halted, and a "Suspend" mode, in which the power supply to all the electric circuits, except for a main memory, is halted after data required for resuming the task are saved in the main memory.

As is well known, CPU chips are the units that constitute the nuclei for the computations that are performed by computer systems. Recently, as production techniques for manufacturing semiconductor devices have improved, as is demonstrated by the reduction in the wiring width, the operating frequencies of CPUs have increased even more. For example, there have appeared CPU chips, such as the "Pentium" sold by Intel Corp. and the "PowerPC" (a trademark of IBM Corp. PowerPC is jointly developed by IBM Corp., Motorola Corp. and Apple Corp.), that can be driven at operating frequencies that exceed 100 MHz. The performance of a CPU and its operating frequency are very closely related. And as the operational speed of a CPU rises, the speed at which it performs calculations increases accordingly. A fast CPU demonstrates its excellent capabilities especially when running large application programs and when performing graphics procedures.

But as nothing is perfect, the high processing speed of the CPU brings with it several problems. One of the problems concerns the increased power consumption by the CPUs and the consequent heat generation. As the strength of a current that flows across a transistor gate (i.e., a resistor) per unit time increases, the power consumption and the heat generation also increase. Theoretically, the power consumption by a CPU is proportional to the operating frequency. Currently, the ratio of the power consumption by a CPU to the total power consumption by the system can not be ignored.

The power management functions of a CPU, such as the "CPU slow clock/stop clock", are provided to overcome the above described condition. The "slow clock" and the "stop clock" are modes in which, when the system determines that the CPU is in the standby state (i.e., the CPU is in the idle state: e.g., the condition that a predetermined time has elapsed since a last key/mouse input), power consumption is reduced by lowering the operating frequency of the CPU (i.e., the performance of the CPU is lowered), or by entirely halting its operating clock. It should be noted that the performance of the CPU is lowered only up to the point at which neither turn-around time (i.e., the time that elapses from the reception of a request until the generation of an affirmative response) nor through-put (the quantity of jobs per unit time) is deteriorated. The "slow clock" function and the "stop clock" function of the CPU will now be described.

The slow clock function of the CPU can be achieved by changing the frequency of a clock signal that is inputted by an external oscillator. This function can also be achieved by changing a CPU chip's internal operating frequency while maintaining a constant external input clock frequency. A high speed processing CPU ordinarily receives a relatively low clock signal (for example, 66 MHz) and internally increases the speed of an operating clock (to, for example, doubles the speed, 133 MHz) by using an incorporated PLL (Phase Lock Loop) circuit. It is difficult for this type of CPU to drastically change an input clock frequency to the CPU chip because of the characteristic of a PLL circuit (e.g., the inherent vibration count of the oscillator or a delay time (several msec) required until the phase locking is performed). Therefore, another design method is employed for a CPU chip that incorporates both a PLL circuit and a slow clock function (power management function) that internally switches an operating clock. According to this method, the incorporated PLL circuit usually increases an input clock speed while the internal slow clock function autonomously lowers the performance of the CPU in the chip.

FIG. 7 is a schematic diagram illustrating the internal arrangement of a CPU that incorporates a power management function. In FIG. 7, a CPU chip 11 comprises a functional unit 11a that actually performs computation; a PLL circuit 11b that transmits, to the functional unit 11a, an operating clock signal for synchronous driving; and a performance controller 11c that controls the performance of the functional unit 11a. The CPU chip 11 communicates with its peripheral devices (not shown) via a processor bus 12.

The function of a PLL circuit whereby the frequency of an input clock signal is multiplied is well known. The PLL circuit 11b doubles the speed (66 MHz, for example) of a relatively slow clock signal to obtain an operating frequency (133 MHz, for example), and transmits the doubled clock signal to the functional unit 11a.

The functional unit 11a can be divided into a computation unit (a double shaded portion in FIG. 7) and an internal cache/control unit. The computation unit is a section whose performance can, to a degree, be reduced in accordance with the activity of the system (it should be noted that the performance of the computation unit must be lowered only to the degree that the turn around time and the through-put are not deteriorated). The internal cache/control unit is a section that must respond to an external event, such as a cache snoop, an interrupt request (INTR/NMI/SMI), or a hold request (HOLD) of the bus 12, that occurs in a time critical manner and unperiodically, and thus, its performance can not be easily reduced regardless of the activity of the system.

The performance controller 11c controls the performance of the functional unit 11a in response to a control signal STPCLK# received from an external device. More specifically, while the STPCLK# is active (i.e., low), the controller 11c halts the supply of the operating frequency to the computation unit (the double shaded portion in FIG. 7) in the functional unit 11a. That is, the CPU chip 11 is so designed that its performance can be reduced locally. As a modification method, the STPCLK# inputted to the performance controller 11c is intermittently changed to active (i.e., goes low) to reduce the frequency of the operating clock transmitted from the PLL controller 11b. For example, if the STPCLK# is set active (i.e., goes low) according to a predetermined cycle and the frequency of the operating clock is reduced by one of n times, the performance and power consumption of the computation unit is reduced to about (n−1)/n. The function that intermittently affects the STPCLK# input operation is generally called "clock throttling" or "frequency emulation".

SL enhanced 486s, DX2s and DX4s, and Pentiums, which are chips that have succeeded the "80486" CPU chip from Intel Corp., have the power saving function that is shown in FIG. 7. These chips include STPCLK# as one of control signals along the processor bus 12.

The "stop clock" function completely suspends the input clocks supplied by the oscillator 40, and halts the entire functional unit 11a. The complete stopping of the operating clock can be accomplished by virtue of a fully static arrangement of the CPU chip 11 in which a storing and saving function is not required. In the "stop clock" mode, the power consumption by the CPU is, at most, several hundreds of mW. The stop clock function can be regarded as an ultimate power management operation.

SUMMARY OF THE INVENTION

One purpose of the present invention is to provide an excellent information processing system with a power management function that lowers the power consumption by reducing the operating frequency (CPU), or by completely halting the operation of the processor.

It is another purpose of the present invention to provide an excellent information processing system that can reduce the operating frequency of a CPU, or completely halt the operation of the CPU, while the system satisfactorily responds to power management and system security requests.

It is an additional purpose of the present invention to provide an excellent information processing system that can reduce the operating frequency of a CPU, or completely halt the operation of the CPU, in accordance with an appropriate timing by exactly understanding the operational state of the CPU.

It is a further purpose of the present invention to provide an excellent information processing system that can reduce the operating frequency of a CPU, or completely halt the operation of the CPU, in accordance with an appropriate timing even when asynchronous communication with peripheral devices is being performed.

BRIEF DESCRIPTION OF THE DRAWINGS

Some of the purposes of the invention having been stated, others will appear as the description proceeds, when taken in connection with the accompanying drawings, in which:

FIG. 5 is a diagram showing a data transfer (data writing) performed between a CPU and an HDD.

FIG. 6 is a diagram showing a data transfer (data reading) performed between a CPU and an HDD.

DESCRIPTION OF THE PREFERRED EMBODIMENT(S)

While the present invention will be described more fully hereinafter with reference to the accompanying drawings, in which a preferred embodiment of the present invention is shown, it is to be understood at the outset of the description which follows that persons of skill in the appropriate arts may modify the invention here described while still achieving the favorable results of the invention. Accordingly, the description which follows is to be understood as being a broad, teaching disclosure directed to persons of skill in the appropriate arts, and not as limiting upon the present invention.

One of the problems that arise as the processing speed of a CPU becomes greater concerns an increase in the power consumption (previously described). Another problem is that there is an increase in the gap of the operating speed between the CPU and external devices (a main memory and other peripheral devices). Obviously, the speed increase of a CPU is useless unless the peripheral devices are so designed as to match the increased speed of the CPU. However, it is difficult to eliminate the gap between them. For example, since the operations performed by a hard disk drive (HDD), such as a head seek operation in accessing to the disk, are mechanical in nature, increase in its processing speed is limited to a degree. As a result, almost all the peripheral devices are operated asynchronously with the CPU.

The basic principle of asynchronous operation is that, when a CPU issues an instruction for an operation to a peripheral device, the CPU does not constantly monitor the execution of the operation by the peripheral device, and returns to the original operation. On the other hand, when the peripheral device completes its operation, it notifies the CPU to the completion by using an interrupt request (IRQ) reserved for itself. Upon the receipt of the IRQ, the CPU accesses a status register for the peripheral device and confirms that the execution of the instruction has been completed successfully. Such confirming operation between the CPU and the peripheral device by repeating the IRQ and the status reading is called a "handshaking operation". The handshaking operation is an important operation for preventing the loss of data exchanged between the CPU and the peripheral device and for improving the security of a system.

Figure 8:
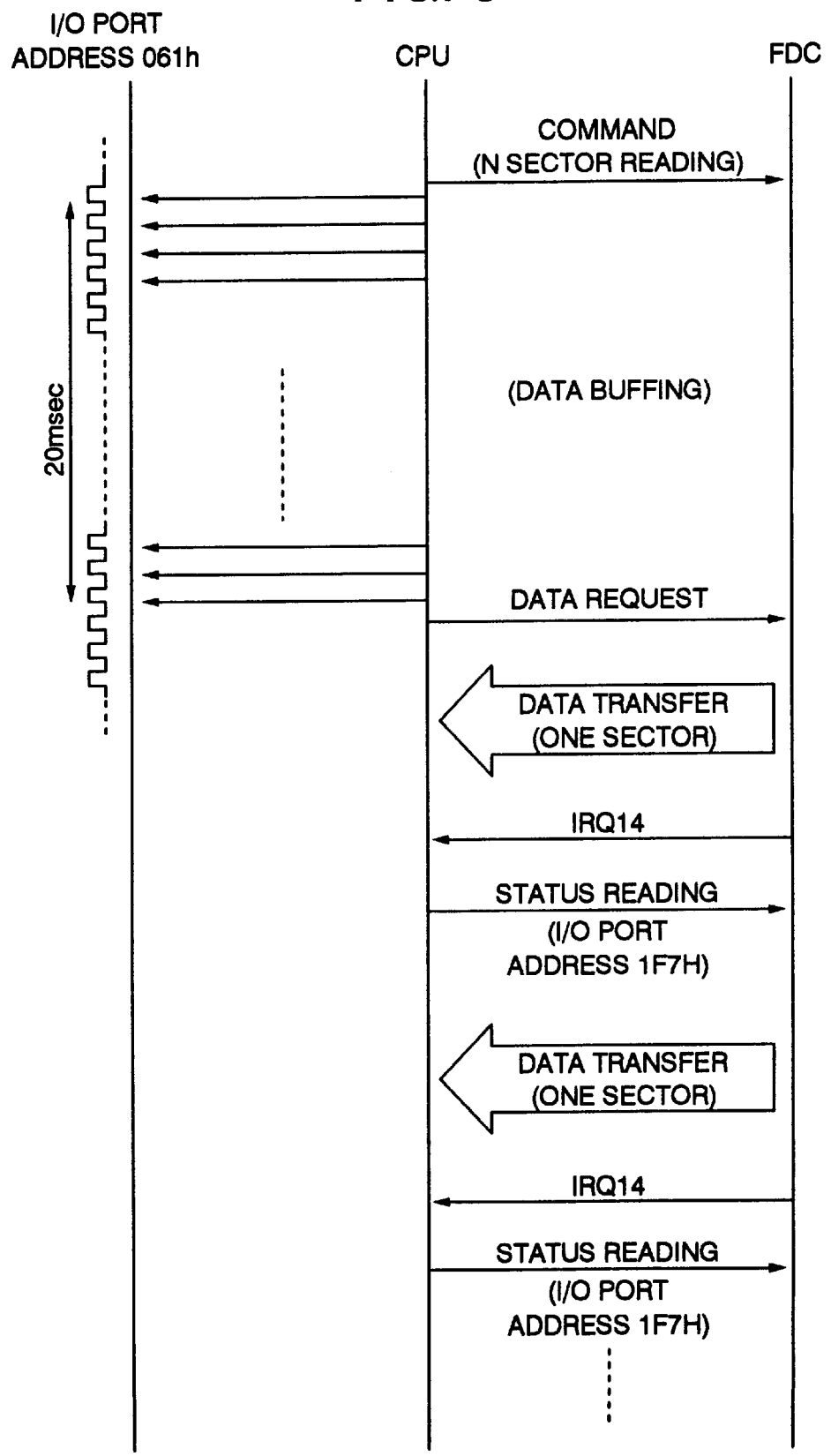
FIG. 8 is a diagram showing a transaction for the CPU, or more specifically, showing asynchronous communication (data writing) between the CPU and the HDD during handshaking.

The data transfer performed between a CPU and an HDD is employed to briefly explain asynchronous communication and the handshaking operation (see FIG. 8). First, the CPU transmits a command (a write command in FIG. 8) to the HDD. Within about 20 msec following the transmission of the command, the HDD prepares for data buffering and then issues a data request. Commonly, a data transfer is performed by sectors (one sector is 512 bytes). Since I/O port address 1F7$h$ that has a length of one word (=two bytes) is assigned to the data register for the HDD, 256 times access cycles are required for a single data transfer (i.e., 256 times sequential one word transfers). Each time one sector data transfer has been completed, the HDD issues an interrupt request (IRQ 14), and in response to the IRQ, the CPU (more specifically, the BIOS) accesses the status register for the HDD (I/O port address 1F7$h$) and confirms the status, i.e., the result of the write operation. The interrupt request and the status reading performed in response to the interrupt request constitute the so-called "handshaking operation". If the command from the CPU indicates data transfer for n sectors, the procedures for the data transfer and the handshaking operation are repeated n times.

For the purpose of counting 20 msec that is the period of time before a data request, a status bit, that is issued by a PIT (Programmable Interval Timer) for the use of a memory refresh request, is employed. The access to I/O port address 061$h$, which is assigned to the status bit, is repeated while waiting for the data request. It should be noted that the time out value of 20 msec is a value determined based on the specifications for the HDD.

The processing speed for the asynchronous communication is determined by the speed of a low speed peripheral device, so that accordingly the CPU has to wait. Thus, from the view point of power management, it is preferable that the performance of the CPU be lowered during the asynchronous communication to enhance the power saving effect. During the asynchronous communication, however, the CPU must process interrupt requests as needed because of the handshaking operation with the peripheral device. For the data transfer of n sectors to an HDD, the handshaking operation must be performed n times. As the interrupt request is an external event that occurs in a time critical manner, the CPU can not rapidly respond to a request if it has entered the lower performance state. If during the asynchronous communication the CPU has entered the power management mode (i.e., in the low performance state), the handshaking operation will fail and data will be lost accordingly.

Figure 7:
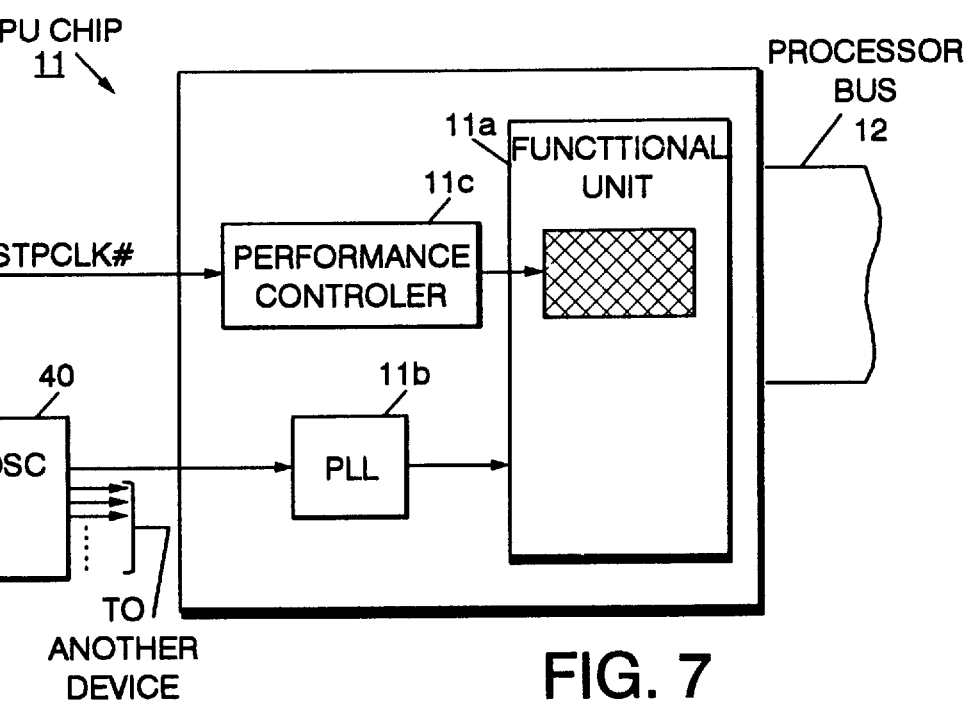
FIG. 7 is a schematic diagram illustrating the internal arrangement of a CPU chip 11 that incorporates a power management function.

With security of the system being regarded as more important, almost all the PCs currently on sale operate their CPUs at full speed and in normal mode (i.e., at a high operating frequency) even during the asynchronous communication. The systems are so designed that, even when the CPU is being operated in a slow clock mode or a stop clock mode, the CPU is returned to the normal mode when it starts the asynchronous communication. Regardless of how much the activity of the CPU is reduced, power saving procedures involving the CPU can not be begun during the asynchronous communication. As a result, even when a CPU chip incorporates an excellent power saving function (see FIG. 7), the occasions on which the system can employ this function are limited, such as when there has been no key input for a predetermined time period or longer. When the CPU is only set in the slow clock mode or in the stop clock mode during such short periods of time, the effect obtained by power management is inadequate. It is desirable that the periods during which power saving involving the CPU is performed be extended.

To achieve the purposes of this invention as expressed above, according to a first aspect of the present invention, an information processing system comprises: (a) a CPU that is operated in a normal mode during which the CPU is driven at a relatively fast operating clock rate, and a power saving mode during which the operating clock has a lower rate or is halted; (b) at least one peripheral device; (c) a bus for performing communication between the CPU and the peripheral device; (d) termination detection means for detecting a completion of a predetermined transaction between the CPU and the peripheral device; (e) time counting means for measuring a predetermined period of time after the completion of the predetermined transaction; and (f) power saving control means for having the CPU enter the power saving mode until the time counted by the time counting means reaches the predetermined period of time.

According to a second aspect of the present invention, an information processing system comprises: (a) a CPU that is operated in a normal mode during which the CPU is driven at a relatively fast operating clock rate, and a power saving mode during which the operating clock has a lower rate or halted; (b) one or more peripheral devices, including a hard disk drive; (c) a bus for performing communication between the CPU and the peripheral devices; (d) termination detection means for detecting a completion of data transfer for one sector between the CPU and the hard disk drive; (e) time counting means for measuring a predetermined period of time after the completion of data transfer for one sector; and (f) power saving control means for having the CPU enter the power saving mode until the time counted by the time counting means reaches said predetermined period of time.

Some external events require a time critical process by the CPU. Such events are, for example, a cache snoop request, an INTR (INTR is a control signal issued by an interrupt controller in response to the interrupt requests IRQ from the peripheral devices), an NMI (non-maskable interrupt), an SMI (system management interrupt), and a HOLD (a request for relinquishing the control of the processor bus). When the CPU receives these external events, it must be fully active in the normal mode, i.e., at a high operating frequency, to handle such events urgently. In accordance with the empirical rules of the present inventors, however, the following matters concerning a current computer system are obvious: 1. since some external events occur following specific transactions executed by the CPU, the timing at which they occur can be detected; and 2. the CPU is merely waiting during a predetermined period immediately before the occurrence of such external events.

According to a first aspect of the present invention, when the completion of a predetermined transaction performed between the CPU and the peripheral device is detected, the CPU enters the power saving mode during a predetermined period of time since the completion of the transaction.

As is described above, the CPU and the peripheral device are operated asynchronously, and since an interrupt request is issued for the handshaking operation while both devices are communicating with each other, the CPU must rapidly respond to that interrupt request. It is understood, however, that the CPU is only waiting for a predetermined period of time since the termination of a predetermined transaction and until the next interrupt request is issued.

According to the first aspect of the present invention, in this context, the performance of the CPU can be lowered so that its power consumption is effectively saved with maintaining the security of the system, the CPU can be recovered to the normal mode before an interrupt request is issued.

According to a second aspect of the present invention, when a data transfer of one sector between the CPU and the hard disk drive (HDD) has been completed, the CPU enters the power saving mode during a predetermined period of time since the completion of the data transfer.

As is described above, a data transfer between the CPU and the HDD is performed by one sector. When the data transfer of one sector has been completed, a predetermined period of time is required for physically reading the data from or writing the data to the disk. Reading from or writing to a disk generally requires approximately 3 msec, during which the CPU is merely waiting. Thereafter, the HDD issues an interrupt request (IRQ 14) as notification that the reading from or writing to the disk has been completed. In response to the request, the CPU accesses the status register (I/O port address 1F7$h$) of the HDD and confirms the state, i.e., the result of the read/write operation. The interrupt request from the HDD and the status reading by the CPU constitute a so-called "handshaking" operation. The sequential procedures performed during the handshaking operation are repeated each time the data transfer of one sector has been completed. The time required for the physical reading from and writing to the disk, i.e., a wait time that continues until the occurrence of an interrupt request is about 3 msec. During this period, the CPU is not operated, and can be completely halted. On the other hand, when an interrupt request is issued after the wait period, the CPU must be fully active in the normal mode to handle the interrupt request urgently. Once the CPU is completely halted, the recovery to the normal mode requires a delay time of approximately 1 msec.

According to the second aspect, while the CPU enters the power saving mode immediately after the data transfer of one sector has been completed, the elapsed time since the termination of data transfer is counted, and then the CPU is recovered to the normal mode 1 msec before the interrupt (IRQ 14) may be issued. Therefore, even during the asynchronous communication, power saving can be preferably performed by utilizing the wait time. In addition, since the CPU recovers to the normal mode in advance, the operation of the CPU is stabilized by the time the interrupt request (IRQ 14) may occur, and thus can promptly respond to the request in a time critical manner. In other words, both power management effects and the security of the system can be satisfied.

The completion of the data transfer of one sector can be detected when the BIOS, which actually operates the hardware, has counted 256 accesses of the data register (I/O port address 1F0$h$) of the HDD. Further, for a time count begun following this detection, only a time period that terminates about 1 msec before the wait time expires need be detected. The time counting function can be implemented by special hardware for inputting a clock signal from an oscillator. This special hardware is, for example, a power management LSI that will be described later.

Figure 1:
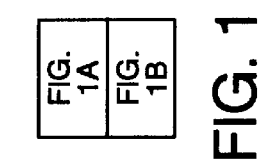

FIG. 1 is a diagram showing the hardware arrangement of a personal computer (PC) 100 employed for implementing the present invention. The individual sections will now be explained.

A CPU 11, a main controller, employs an operating system (OS) to execute various programs. A processor bus 12 that runs from the CPU 11 communicates with the individual peripheral devices, which will be described later, across two bus layers, which are a local bus 16 and a system bus 22. The CPU 11 has substantially the same structure as that shown in FIG. 7, and a "Pentium/1xx MHz" sold by Intel Corp. may be employed, for example. The buses 12, 16, and 22 are common signal path lines that each includes a data bus, an address bus, and a control bus. The local bus 16 is a relatively high speed bus that connects peripheral devices, such as graphic devices. A PCI (Peripheral Component Interconnect), supported by Intel Corp., is one example of such a local bus 16. The system bus 22 is a bus that connects relatively slow peripheral devices, such as an FDD, with an ISA (Industry Standard Architecture) bus being one example.

The processor bus 12 and the local bus 16 communicate with each other across a bridge circuit (host-PCI bridge) 14. The bridge circuit 14 in this embodiment includes a memory controller for controlling the access to a main memory 15, and a data buffer for absorbing the speed gap between the buses 12 and 16. The main memory 15 is a volatile memory (RAM) in which programs (the OS and application programs) that the CPU 11 executes are loaded, or that the CPU 11 employs as a work area. Dynamic RAM (DRAM), which is readily available and with which a large memory capacity can be acquired relatively inexpensively, and a capacity of, for example, about 8 MB is considered standard. An external cache (also called a "Level 2 (L2) - cache") 13 is provided to absorb the difference between the processing speed of the CPU 11 and the access speed to the main memory 15. The L2-cache 13 is constituted by static RAM (SRAM), which is faster than DRAM, and has a memory capacity of approximately 256 KB, for example.

Peripheral devices, such as a video controller 17, for which a relatively high speed is required, are connected to the local bus 16. The video controller 17 is a peripheral controller for actually processing a drawing command that is sent from the CPU 11. The processed drawing information is temporarily written to a screen buffer (VRAM) 18, and the written drawing information is read from the VRAM 18 and is outputted to a liquid crystal display (LCD) 19, which serves as display means.

The local bus 16 and the system bus 22 communicate with each other across a bridge circuit (PCI-ISA bridge) 20. The bridge circuit 20 in this embodiment includes a DMA (Direct Memory Access) controller, an interrupt controller, and a programmable interval timer (PIT). The DMA controller is a peripheral controller that transfers data between the main memory 15 and peripheral devices, such as an FDD 27, without the involvement of the CPU 11. The interrupt controller handles hardware interrupt requests (IRQ) from the individual peripheral devices and transmits them to the CPU 11. The PIT supplies several types of timer signals to the individual sections of the system 100. A timer signal generated by the PIT is, for example, a periodical interrupt that is provided to an OS/BIOS at an interval of 55 msec, a refresh timer signal for which the low/high level is switched at an interval of 15.2 μsec, or a tone generation signal for the production of audio sounds.

The bridge circuit 20 further includes an interface (for example, an IDE (Integrated Drive Electronics) interface, which connects a hard disk drive (HDD) 21 that serves as an auxiliary storage device. Originally, the IDE was the standard interface for directly connecting a hard disk drive (HDD) to an ISA bus. The IDE interface portion of the bridge circuit 20 includes a data register, a control register, and a status register of the HDD 21. The individual I/O port addresses are assigned to these registers respectively (described later).

The two bridge circuits 14 and 20 conform to the PCI, and are generally provided by a single chip set. A chip set example is "Triton", which is sold by Intel Corp.

To the system bus 22 are connected relatively low speed peripheral devices, such as an I/O controller 23, a floppy disk controller (FDC) 26, a keyboard/mouse controller (KMC) 28, an audio controller 31, a ROM 34, and a power management LSI 50.

The I/O controller 23 is a peripheral controller for controlling the exchange of data with external devices via a communication port, such as a serial port 24 or a parallel port 25. An example specification for a serial port is RS-232C, and an example specification for a parallel port is Centronics.

The FDC 26 is a dedicated controller for driving and controlling a floppy disk drive (FDD) 27.

The KMC 28 is a controller for processing a matrix input at a keyboard 29, and a coordinate set pointed at by a mouse 30. The KMC 28 converts an input signal into a format that conforms to the definition of the OS and outputs the result to the bus 22.

The audio controller 31 is a peripheral controller for handling input and output of audio signals. One of the functions of the audio controller 31 is the generation of a tone signal based on a specific frequency signal generated by the PIT. The output signal from the audio controller 31 is, for example, amplified by an amplifier 32, and the amplified signal is outputted through a loudspeaker 33.

The ROM 34 is nonvolatile memory for which written data are determined at the time of manufacture, and is employed for the permanent storage of predetermined codes. The codes stored in the ROM 34 include a test program (POST) that is executed when the system 100 is powered on, and a program (BIOS) for controlling data input and output operation by the individual hardware components in the system 100.

An oscillator (OSC) 40 supplies an operating clock signal with a specific frequency to a synchronously driven chip, such as the CPU 11, or a device having a timer function. A clock signal is transmitted to the CPU 11 via a clock controller 60.

A power management LSI (PM-LSI) 50 is provided to accomplish an appropriate power management operation for the CPU 11. More specifically, an instruction is received from the CPU 11 (more specifically, the BIOS operated by using hardware) via the bus 16/22, and the operational mode of the CPU 11 is determined in accordance with the received instruction. The PM-LSI chip 50 is manufactured with a semi-custom design like a gate array. The LSI chip 50 occupies the main role in implementing the present invention, and its detailed structure and operational characteristics will be described later in the divisions C and D.

The clock controller 60 halts, as needed, an input clock supplied by the OSC 40 to the CPU 11, and is activated upon the receipt of a control signal, which is outputted by the power management LSI 50.

Almost all the PCs that are currently on sale in the market have hardware components that are equivalent to the block components that are denoted by reference numbers 11 through 40. Although many electric circuits other than those shown in FIG. 1 are required to constitute a PC, as they are well known to a person having ordinary skill in the part, and do not relate to the subject of the present invention, no explanation for these components is given in this specification.

Figure 2:
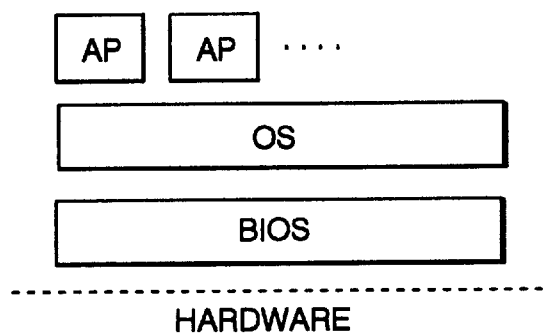
FIG. 2 is a schematic diagram illustrating the software hierarchial arrangement that can be executed by the PC 100, which is employed for the present invention.

FIG. 2 is a schematic diagram illustrating the software arrangement that can be executed by the PC 100, which is employed for carrying out the present invention.

BIOS layer:

The software at the lowest layer is a BIOS (Basic Input/Output System). The BIOS is a program assembly that consists of the basic operation commands for controlling the individual hardware components (the video controller 17, the keyboard 29, the HDD 21, and the FDC 26) in the system 100. Upon receipt of a call from programs of the higher layer (an operating system or application programs, which will be described later), the BIOS performs the actual hardware control. The BIOS includes a boot strap routine that is performed when the system 100 is powered on, and a routine (an interrupt handler) for handling interrupt requests generated on the bus 22.

OS (Operating system) layer:

The OS is the basic software for the total management of the hardware and the software of the system 100, and OS/2 ("OS/2" is a trademark of IBM Corp.) or Windows("" is a trademark of Microsoft Corp.) corresponds to the operating system. The OS also includes a "file manager" for managing the files stored in a storage device such as the HDD 21, a "scheduler" for determining the order of execution of tasks for the CPU 11 and their priority order, and a "memory manager" for managing the allocation of the memory. Further, a "user interface" (a system command and a system call) for the windows display and for the manipulation of a mouse is also included.

In addition, it should be understood that a "device driver" later added as hardware operation software is also a part of the OS. An example device driver is a display driver for driving a display device, such as the LCD 19.

AP (Application program) layer:

The uppermost level is occupied by APs. Programs for word processing, databases, calculations for charts, communication, etc., correspond to the APs. The APs are loaded, as needed, from the HDD 21 and the FDD 27 to the main memory 15 in accordance with the intent of a user.

The software hierarchial structure shown in FIG. 2 is well known to a person having ordinary skill in the art.

Figure 3:
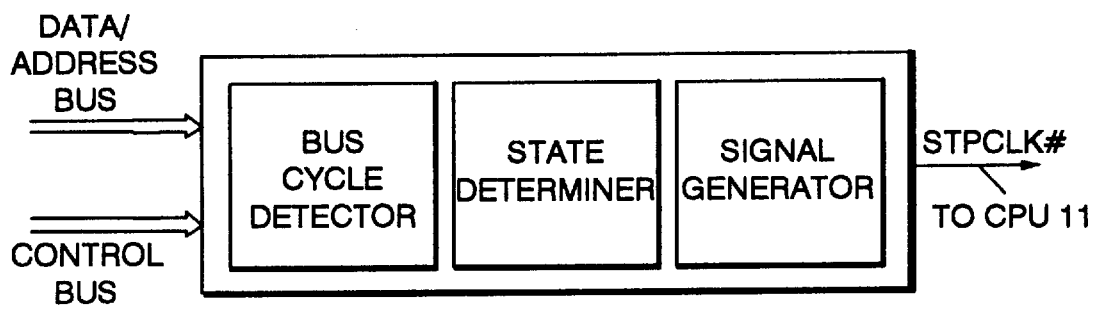
FIG. 3 is a diagram showing the internal arrangement of a power management LSI according to one embodiment of the present invention.

FIG. 3 is a diagram showing the internal arrangement of the power management LSI (PM-LSI) 50. The LSI chip 50 is mounted in the system 100 to appropriately accomplish the power management operation of the CPU according to the embodiment.

As is shown in FIG. 3, the PM-LSI 50 includes an interface unit 50a, a state determiner 50b, and a signal generator 50c.

The interface unit 50a is directly connected to the system bus 22 and communicates with the CPU 11 (more specifically, with the BIOS that operates the hardware). The BIOS notifies the interface unit 50a each time data transfer for one sector between the HDD 21 and the CPU 11 has been completed.

Figure 1A:
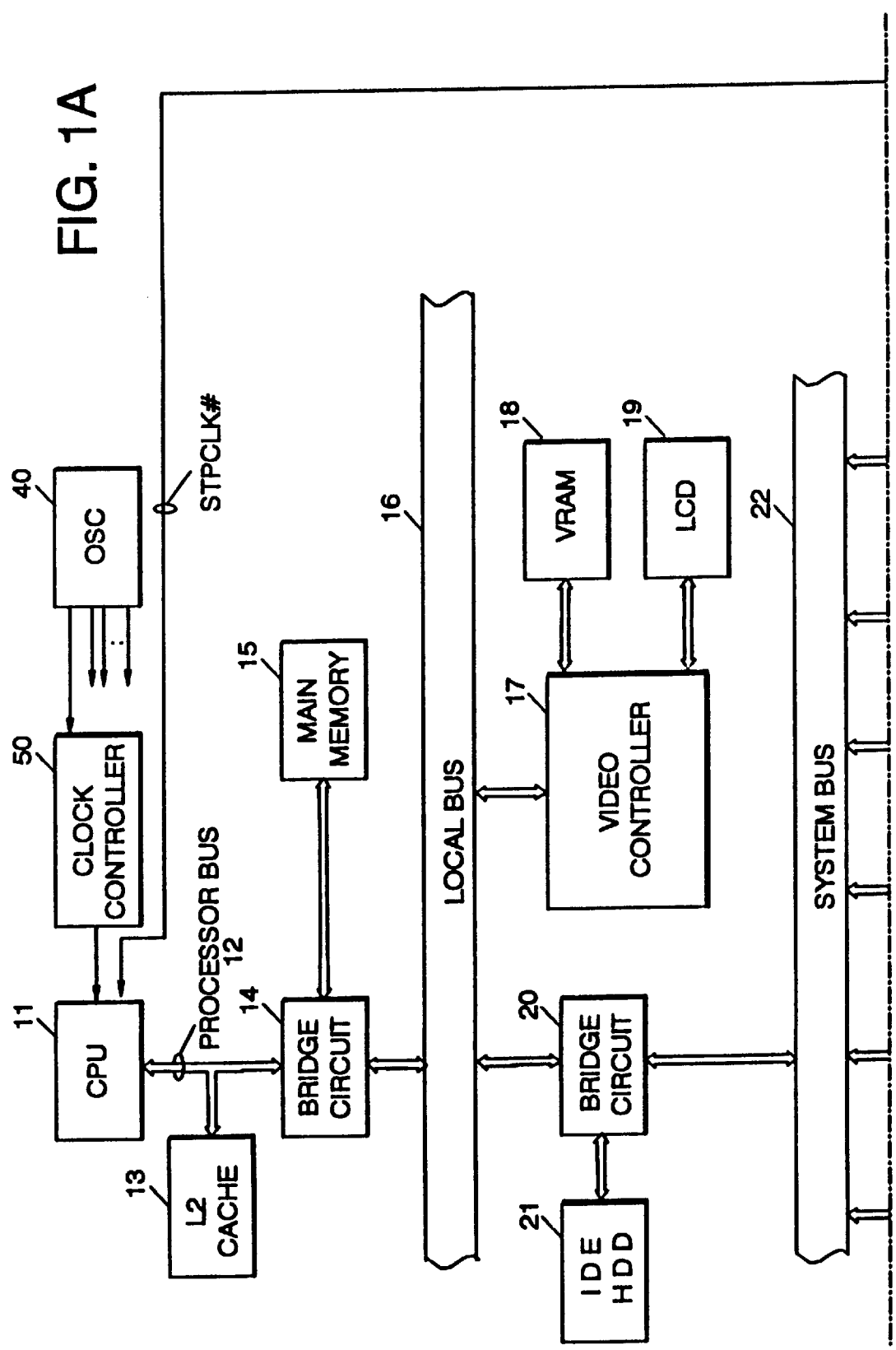
FIG. 1 is a diagram illustrating the hardware arrangement of a personal computer (PC) 100 that is employed for carrying out the present invention.
Figure 1B:
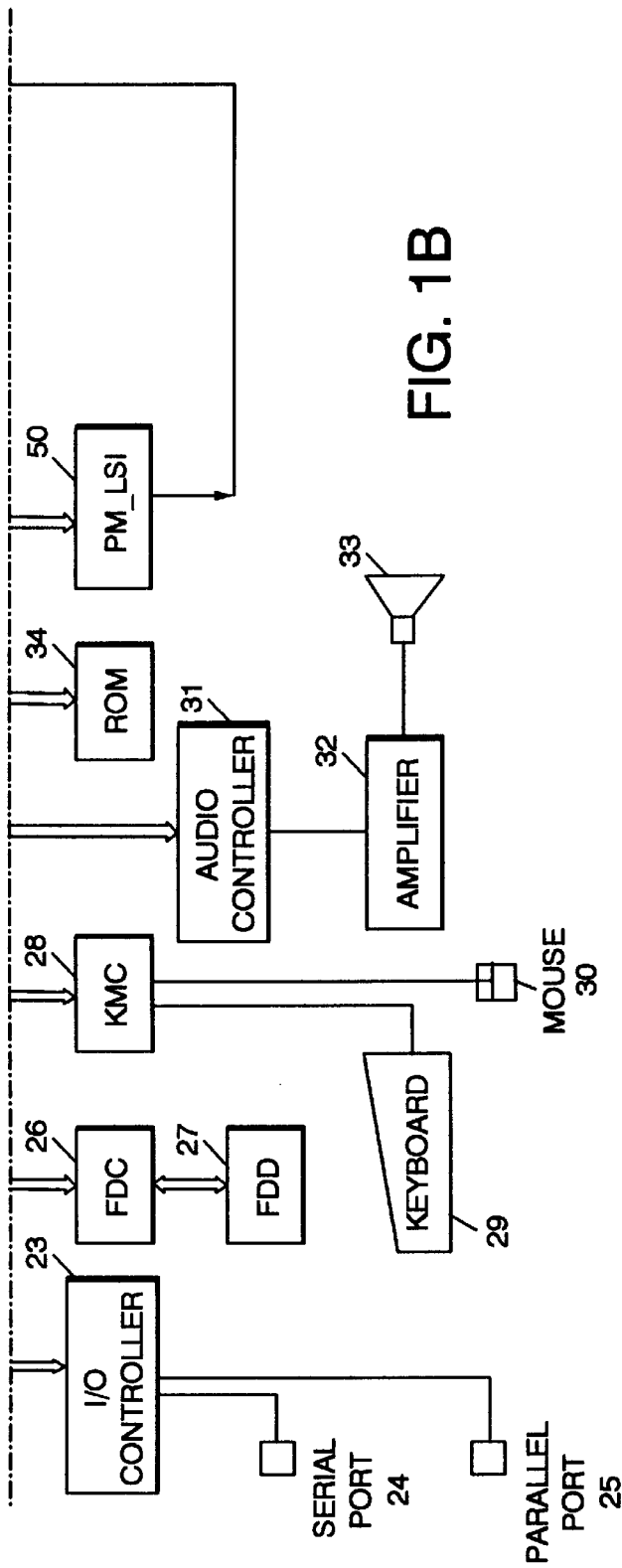
Figure 4:
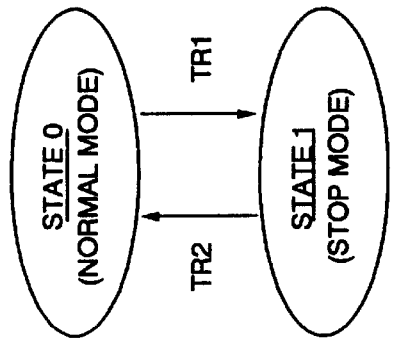
FIG. 4 is a state machine diagram showing the operational characteristics of a state determiner 50b.

The state determiner 50b is a circuit for determining the operational mode of the CPU 11 in accordance with an instruction by the BIOS. FIG. 4 is a state machine diagram showing the operational characteristics of the state determiner 50b. As is shown in FIG. 4, the state determiner 50b enters, as needed, a state 0, which corresponds to the normal mode of the CPU chip 11. The state determiner 50b also enters a state 1, which corresponds to the stop mode (or the stop clock mode) in which the operating clock is halted. The transition from the state 0 to the state 1 is performed when notification that the data transfer for one sector has been completed is received from the BIOS (i.e., transition event Tr1). The recovery from the state 1 to the state 0 is performed when a predetermined period of time T has elapsed since the occurrence of transition event Tr1 (i.e., transition event Tr2). The predetermined period of time T is determined based on the wait time during which the CPU 11 waits while data reading from or writing to the HDD is being performed. If the wait time is, for example, 3 msec, 2 msec, which is obtained by subtracting a delay time (1 msec) required for the CPU 11 to recover to the normal mode, corresponds to the predetermined period of time T. The state determiner 50b receives a clock signal from the OSC 40 and has an included timer function (not shown) for counting the predetermined period of time T.

The signal generator 50c generates and transmits a control signal to the clock controller 60 in response to a determination by the state determiner 50b that the state should be the state 1. Upon receipt of the control signal, the clock controller 60 is activated and halts the supply of the clock to the CPU 11. Therefore, the CPU 11 is in the stop mode during a period in which the state determiner 50b is in the state 1.

The hardware and software arrangements of the computer system that embody the present invention have been described hereinabove. According to one aspect, the present invention accomplishes the power management operation even while asynchronous communication between the CPU 11 and the HDD 21 is being performed. The power management operation will be now described in detail.

FIG. 5 is a data writing operation that is asynchronously performed between the CPU 11 and the HDD 21. The data writing operation is divided into a command phase, a data buffering phase, a data request phase, a data transfer phase, a wait phase, and a handshaking phase.

In the command phase, the CPU 11 (more specifically, the BIOS that operates the hardware) transmits a command to the HDD 21. This command designates the number of sectors of data to be written and the disk sectors to which they should be written.

In the data buffering phase, the HDD 21 performs buffering for data for one of the designated sectors before data transfer is to be performed. The time required for data buffering varies depending on the specification of the HDD 21, but is generally approximately 20 msec. The BIOS counts the time that elapses since the transmission of the command. The BIOS counts by watching, for example, a refresh timer signal generated by the PIT (programmable interval timer).

When 20 msec has elapsed, the operation enters the data request phase, wherein the CPU 11 (BIOS) requests the HDD 21 to perform a data transfer. Upon the request, the HDD 21 begins to data transfer for one sector (data transfer phase). Since the data register (I/O port address 1F0$h$) for the HDD 21 has a one word length (=two bytes), the data transfer of one sector (=512 bytes) requires 256 times accesses to I/O port address 1F0$h$. In other words, the BIOS that actually executes the data transfer operation can detect the termination of the data transfer phase by counting the number of accesses to the I/O port address 1F0$h$.

When the data transfer phase is terminated, the HDD 21 actually writes the transferred data to its disk. The data writing takes about 3 msec, and the CPU 11 must wait during this period (wait phase). The BIOS notifies the PM-LSI 50 of the termination of the data transfer (transition event Tr1). In response to this notification, the state determiner 50b of the PM-LSI 50 enters the state 1. Upon the transition to the state 1, the signal generator 50c transmits a control signal to the clock controller 60. As a result, the clock controller 60 is activated and halts the supply of a clock to the CPU 11, which is then completely halted.

Upon receipt of the notification of the completion of the data transfer phase, the state determiner 50b begins a time count until the predetermined period of time T is expired. The predetermined period of time T is a value obtained by subtracting the time required for the CPU 11 to recover to the normal mode from an expected period of time at which an interrupt request (IRQ 14) will be issued by the HDD 21 following the termination of the wait phase. As the wait time is approximately 3 msec and about 1 msec is needed to recover to the normal mode, 2 msec is adequate for the predetermined period of time T.

When the predetermined period of time T has elapsed since the termination of the data transfer phase (transition event Tr2), the state determiner 50b is recovered to the state 0. Accordingly, the signal generator 50c halts the output of a control signal, and the clock controller 60 is deactivated. The supply of a clock signal to the CPU 11 is resumed responsively, and the CPU 11 is recovered to the normal mode with a delay time of about 1 msec.

When the HDD 21 has completed writing the data to its disk, it generates an interrupt request (IRQ 14) to notify the CPU 11 to that effect. The IRQ 14 is transmitted via the bridge circuit 20 to the CPU 11. The CPU 11, which has been already recovered to the normal mode, can rapidly handle this request, and accesses the status register of the HDD 21 (I/O port address 1F7$h$)in order to confirm the state of the HDD 21 (i.e., the result of the writing operation) (handshaking phase).

In this manner, the data transfer (data writing) routine for one sector is completed. If the command designated the writing of data for n sectors, the similar sequential performance of the data transfer and the handshaking (interrupt and status reading) is repeated n times.

FIG. 6 is a data reading operation that is asynchronously performed between the CPU 11 and the HDD 21. The data reading operation is divided into a command phase, a data request phase, a data transfer phase, a wait phase, and a handshaking phase.

In the command phase, the CPU 11 (more specifically, the BIOS that operates the hardware) transmits a command to the HDD 21. This command designates the number of sectors of data to be read and the disk sectors from which they should be read.

Sequentially, the HDD 21 reads from its disk the data for one sector to be transferred. The data reading takes about 3 msec, and the CPU 11 must wait during this period (wait phase). The BIOS notifies the PM-LSI 50 of the start of the data reading from the disk (transition event Tr1). In response to this notice, the state determiner 50b enters the state 1, and the CPU 11 is completely halted.

The state determiner 50b counts the time that elapses since the transition to the wait phase. When the above described predetermined period of time T is expired (transition event Tr2), the state determiner 50b is recovered to the state 0, and the CPU 11 is recovered to the normal mode with a delay time of about 1 msec.

When the HDD 21 has completed the data reading from its disk, it generates an interrupt request (IRQ 14) to notify the CPU 11 to that effect. The IRQ 14 is transmitted via the bridge circuit 20 to the CPU 11. The CPU 11, which has been already recovered to the normal mode, can rapidly responds to this request, and accesses to the status register of the HDD 21 (I/O port address 1F7h) in order to perform the status reading operation (handshaking phase).

Following this, when the CPU 11 has confirmed the state of the HDD 21 (i.e., the result of the reading operation), it begins the data transfer of one sector (data transfer phase). As the data register (I/O port address 1F0h) of the HDD 21 has a one word length (=two bytes), the data transfer of one sector (=512 bytes) requires 256 times accesses of I/O port address 1F0h. In other words, the BIOS detects the termination of the transfer phase by counting the number of accesses of I/O port address 1F0h.

When data for n sectors (n 2) are to be read, the above described sequence is repeated n times. That is, when the data transfer phase for one sector is terminated, the BIOS again notifies the PM-LSI 50 to that effect and recovery from the power saving operation during the wait phase period is begun. The following processes are performed in the same manner as is described above.

The present invention has been described in detail while referring to a specific embodiment. However, it should be obvious to one having ordinary skill in the art that various modifications or revisions of the embodiment are possible within the scope of the present invention. The present invention can be employed for various electric/electronic devices, for example: facsimile apparatuses; various cordless devices, such as portable radio terminals, cordless telephones, electronic notebooks and portable video cameras; and word processors. That is, although the present invention has been disclosed by using an example, it should not be limited to that example. To fully understand the subject of the present invention, the claims should be referred to.

The I/O port addresses and the allocation of the IRQ levels, which are described in this specification, conform to the standards of compatible machines of the IBM PC/At series.

As is described in detail, according to the present invention, provided is an excellent information processing system that has a power saving function according to which power consumption can be lowered, as needed, by reducing the operating frequency of a processor (CPU) that serves as the nucleus for data processing, or by completely halting the operation of the processor.

Further, according to the present invention, provided is an excellent information processing system that can reduce the operating frequency of a CPU, or completely halt the operation of the CPU, while the system satisfactorily responds to power management and system security requests.

In addition, according the present invention, provided is an excellent information processing system that can reduce the operating frequency of a CPU, or completely halt the operation of the CPU, at an appropriate timing by exactly ascertaining the operational state of the CPU.

Further, according to the present invention, provided is an excellent information processing system that can reduce the operating frequency of a CPU, or completely halt the operation of the CPU, at an appropriate timing even when asynchronous communication performed with peripheral devices is being performed.

What is claimed is:

1. An information processing system comprising:

(a) a CPU that is operated in a normal mode during which said CPU is driven at a relatively fast operating clock rate, and a power saving mode during which the clock rate is lower or halted;

(b) at least one peripheral device;

(c) a bus for performing communication between said CPU and said peripheral device, wherein said CPU is operative to initiate an asynchronous data transfer cycle between said CPU and said peripheral device, said asynchronous data transfer cycle having at least a data transfer phase and a wait phase;

(d) a termination detector for detecting a completion of said data transfer phase and notifying a power saving circuit of said completion;

(e) said power saving circuit being coupled to said CPU and said bus, said power saving circuit having:

a state determiner which can enter a first state corresponding to the normal mode and a second state corresponding to the power saving mode, said state determiner having a time counter measuring a predetermined period of time after the completion of said data transfer phase, said predetermined period of time being less than a time needed for said wait phase by at least a period of time needed for said CPU to change from said power saving mode to said normal mode;

wherein in response to said notification, said state determiner enters said second state and said power saving circuit is operative to direct said CPU to enter the power saving mode until the time counted by said time counter reaches said predetermined period of time, and wherein after said time counted reaches said predetermined period of time, said state determiner enters said first state and said power saving circuit directs said CPU to return to said normal mode.

2. The information processing system of claim 1, wherein said peripheral device is a hard disk drive and wherein said data transfer phase is a data transfer of one sector between said CPU and said hard disk drive.

3. The information processing system of claim 1, wherein:
said system further includes a clock controller coupled to said CPU, said clock controller being operative to pass or not pass a clock signal to said CPU depending on a state of a control signal input to said clock controller; and said power saving circuit further includes a signal generator for (I) activating said control signal in response to said state determiner entering said second state, and (ii) deactivating said control signal in response to said state determiner entering said first state.

4. The information processing system of claim 1, wherein said system is operative to perform a plurality of asynchronous data transfers cycles between said CPU and said peripheral device, and wherein said state determiner enters said second state and said power saving circuit directs said CPU to enter said power saving mode only in said asynchronous data transfer cycles that have a wait phase which is longer than an amount of time needed for said CPU to change from said power saving mode to said normal mode.

* * * * *